United States Patent [19]

Lewis et al.

[11] Patent Number: 5,209,583

[45] Date of Patent: May 11, 1993

[54] COMPACT PRINTER FOR PORTABLE COMPUTER

[75] Inventors: Kim R. Lewis, Stow; Gary L. Elston, Akron, both of Ohio; Jack P. Hall, Palo Alto; Dennis Kerkhof, Rio del Mar, both of Calif.

[73] Assignee: Telxon Corporation, Akron, Ohio

[21] Appl. No.: 862,628

[22] Filed: Apr. 1, 1992

[51] Int. Cl.[5] ............................................. B41J 3/36
[52] U.S. Cl. ..................................... 400/88; 400/692; 400/693; 312/223.2; 361/391; 361/392
[58] Field of Search ................. 400/88, 691, 692, 693; 312/223.2, 223.3; 361/392, 393, 394, 390, 391

[56] References Cited

U.S. PATENT DOCUMENTS

| | | | |
|---|---|---|---|
| 4,527,285 | 1/1985 | Kekas et al. | 400/692 |
| 4,595,804 | 6/1986 | MacConnell | 400/692 |
| 4,734,710 | 3/1988 | Sato et al. | 346/76 PH |
| 4,881,839 | 11/1989 | Grimm | 400/692 |
| 5,122,005 | 6/1992 | Kamel | 400/692 |

Primary Examiner—Eugene H. Eickholt
Attorney, Agent, or Firm—Pretty, Schroeder, Brueggemann & Clark

[57] ABSTRACT

A printer for a portable computer receives the computer into a well and includes a connector plug that receives a connector socket of the computer. The printer restricts the orientation of the computer when the computer is inserted into the well so that the computer connector can be engaged with the printer's connector only after the computer has been placed in the well and moved along a predetermined axis.

14 Claims, 3 Drawing Sheets

COMPACT PRINTER FOR PORTABLE COMPUTER

BACKGROUND OF THE INVENTION

1. Field of the Invention

This invention relates generally to printers that are adapted for use with portable computers and, more particularly, to compact printers that are adapted to receive and carry portable teletransaction computers or data terminals.

2. Description of the Related Art

Compact printers adapted to receive and carry portable computers or data terminals typically include a housing and associated carrying handle, a printer mechanism with a platen, a printing element and paper supply, a cradle and associated connector for receiving a portable computer, and a power supply, batteries and charging cord. A portable computer can be placed into the cradle of the printer and a connector of the computer can be urged into mating engagement with the connector of the printer. Data that is stored in the portable computer then can be printed out in readable format on the paper.

Compact printers of this kind sometimes will be used to carry a portable computer at a work site. While information is being entered into the computer, the printer is simultaneously providing a readable print-out of the entered data. At other times, data will be entered into the computer prior to its being installed in the printer, and a readable copy of the previously entered data will be produced at a later time. For example, portable computers and compact printers often will be used by delivery personnel to record data relating to successive deliveries and pickups and provide a printout or invoice for each delivery or pickup. The printer must be capable of being transported to work sites where it is needed and also capable of enduring harsh environmental conditions. Therefore, it is very important that the printer have small size, light weight, and good durability. If the portable computer and printer ordinarily will remain connected together, it is preferable that the printer provide some degree of external protection for the computer.

The mating engagement of the printer connector and the portable computer connector must be secure and positive, and must stand up to thousands of coupling cycles without deterioration. One of the two connectors typically includes many small, parallel metal connecting pins that are received into complementary conductive connecting bores in the other connector. Unfortunately, in engaging the two connectors, a user is apt to move the portable computer in a rotating or swinging motion as the computer is brought down into the receiving cradle. The swinging motion can cause the parallel connecting pins of one connector to hit the surface of the other connector or to confront the bores at an angle rather than axially, bending the pins or creating unwanted free play in the pins. Ultimately, the bending or free play can result in pins breaking off.

When connecting pins work loose or break off, the connector must be replaced. It is not unusual for such connectors to require replacement after merely 1000 to 2000 coupling cycles, which can be less than one year of service. The replacement cost of the connector itself is an unwanted expense, but the repair also results in the printer being unavailable.

In operation, some compact printers do not easily accommodate portable computers of various shapes and configurations and do not securely hold the computer in place. In addition, some printers can leave the computer relatively exposed, so that objects can fall against the computer or adverse environmental conditions can affect the computer. In any of these situations, the computer can become damaged and require extensive repair. Further, some printers fail to protect the printer mechanism and control electronics from damage due to environmental factors like rain and snow or falling objects. Yet further, some printers are not convenient to use, either because they do not easily accommodate different portable computers and different configurations, or because their layout makes it awkward to use the printer and computer together.

From the discussion above, it should be apparent that there is a need for a portable compact printer that securely engages with a portable computer, that protects the mating electrical connectors from excessive wear and damage, and that is convenient to use. The present invention satisfies this need.

SUMMARY OF THE INVENTION

The present invention provides a compact printer that can be used with a portable computer, and includes a receiving well that restricts the orientation of the computer when the computer connector is being engaged with the printer connector, so that the computer must be inserted into engagement with the printer connector in a linear motion, axially parallel to the connecting pins. The compact printer includes a mechanical linkage that pushes the computer into engagement with the printer and that operates only when the computer is positioned in the proper orientation. The mechanical linkage moves a retaining member that prevents the computer from moving within the receiving well without operation of the mechanical linkage. The retaining member preferably is an elongated structure that includes a bent end that hooks over a portion of the computer to restrict the orientation of the computer while it is being coupled to the printer. The orientation of the computer can be restricted further by a housing lip that projects over the receiving well and over part of the computer. The lip allows the computer to fit beneath it and to be coupled to the printer only if the computer is in the proper orientation. The printer protects the computer from damage when the computer is in the receiving well, securely engages the computer connector, and ensures that the connecting pins will not become bent during engagement and disengagement. The printer is easily operated with the computer and easily can accommodate a variety of computers.

When the portable computer is to be coupled with the printer, the computer is laid into the receiving well and the mechanical linkage moves the retaining member, which in turn moves the computer forward and pushes the computer connector into engagement with the printer connector. The retaining member and projecting lip prevent the computer from changing its orientation relative to the printer connector when the computer is being moved into engagement, so that the connector bores move axially relative to the connector pins. This prevents the pins from entering the bores at an angle and becoming bent or otherwise damaged in the process.

The retaining member can be two elongated pieces that slide together in the housing but beneath the receiving well and that include bent ends that recede into, and move out from, the inner wall of the receiving well. The mechanical linkage that moves the elongated pieces preferably includes a lever that turns a series of gear wheels and shafts that drive the elongated pieces. This mechanical lever-gear system provides simplicity and convenient torque multiplication, along with good physical feedback, to ensure positive engagement of the connector plug and socket.

The receiving well of the printer completely covers the bottom and sides of the portable computer, leaving only the top keyboard and display of the computer accessible. This protects the computer from most types of external damage when it is being used with the printer.

The printer includes a housing that can contain all the necessary printer hardware, such as the paper supply, platen, printing element, paper feed sprockets and paperfeed mechanism. The receiving well can be located beneath a hinged cover. The housing seams and opening panels are adapted to resist the penetration of environmental dangers such as water, dust, and dirt. Liquids such as rain, melted snow, and spilled beverages are channeled away from critical components of the printer and portable computer. When the receiving well cover is lowered over the computer, the computer likewise is protected against such environmental dangers. If the computer is to be transported or stored in the printer, then the computer will be protected by the printer housing. When the cover is raised to expose the computer in the receiving well, the cover can be laid flat and its underside can be used conveniently as a writing surface.

Other features and advantages of the present invention should be apparent from the following description of the preferred embodiment, taken in conjunction with the accompanying drawings, which illustrate, by way of example, the principles of the invention.

DESCRIPTION OF THE PREFERRED EMBODIMENT

Figure 1:
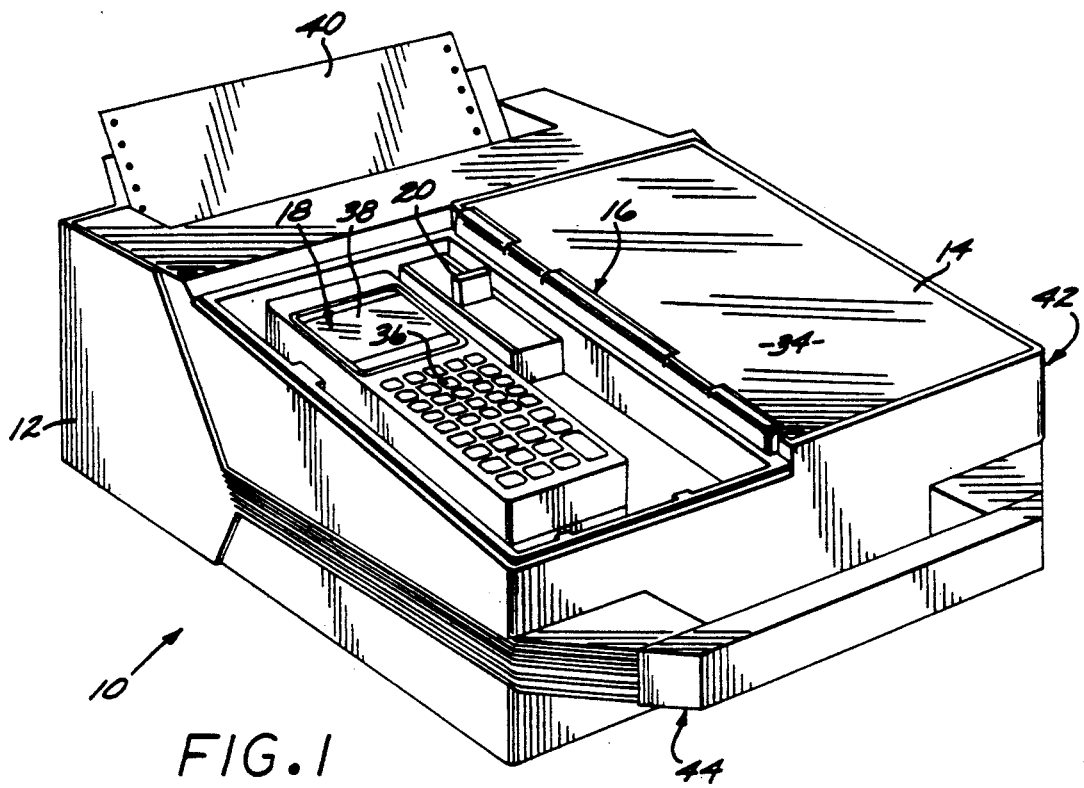
FIG. 1 is a perspective view of a printer system in accordance with the present invention, coupled to a portable computer, with the receiving well's cover raised.
Figure 2:
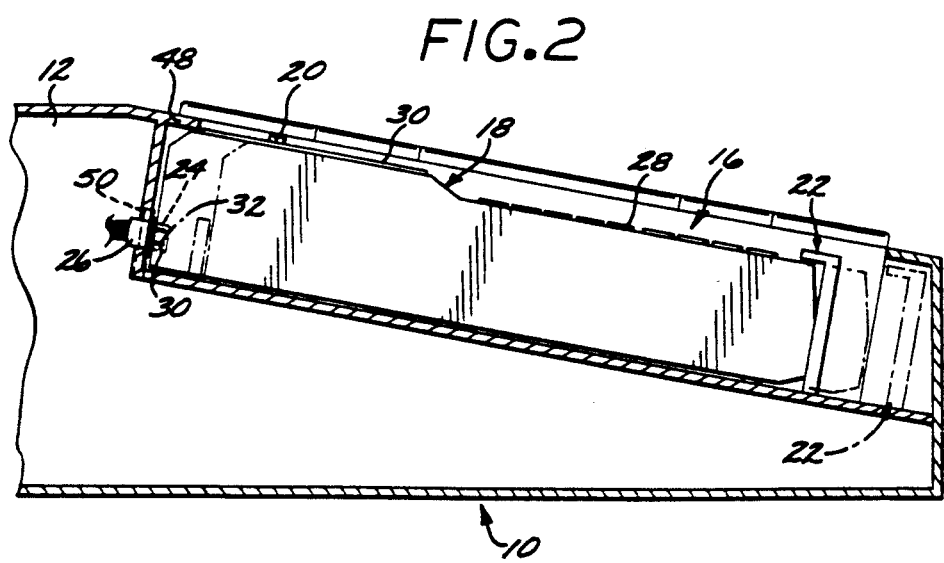
FIG. 2 is a detail side sectional view of the connector plug and socket engagement of the portable computer and printer illustrated in FIG. 1.

Referring now to the drawings, and in particular to FIGS. 1 and 2, a printer 10 includes a housing 12 with a hinged cover 14 that can be pivoted open to expose a receiving well 16 on the left-hand side of the printer for receiving a portable teletransaction computer or data terminal 18. When the portable computer 18 is to be connected to the printer, it is placed in the receiving well and a lever 20 is actuated to move a pair of elongated retaining members 22 (only one of which is visible in FIG. 2) that push the computer forward in the well and cause a connector 24 on the computer to engage a connector 26 in the receiving well 16. Although the computer connector is shown as a socket and the printer connector is shown as a plug, it should be understood that other types of connectors also are suitable Data transferred from the portable computer to the printer can be transmitted immediately via a radio link to a host computer (not shown) or can be stored for subsequent transfer by radio link or otherwise to the host computer. Data likewise can be transmitted via radio link or otherwise from the host computer to the printer.

In FIG. 1, the computer connector 24 cannot be engaged with the printer connector 26 unless the computer 18 is laid flat in the receiving well 16, thereby obviating the risk of using an angular, off-axis, swinging motion to push the computer and its connector into engagement with the printer connector. Thus, receiving bores 30 of the computer connector are moved axially into engagement with pins 32 of the printer connector. Ensuring axial movement of the computer as it is engaged with the printer greatly increases the service life of the pins.

The receiving well cover 14 takes up substantially the left half of the printer's top surface and is hinged such that, when the cover is open, it can be laid flat and its underside 34 can be used as a writing surface. The keyboard 36 of the portable computer 18 can then be used to enter data, which is displayed on the computer's display 38 and can be printed out on paper 40 that is contained within the printer housing 12. The orientation of the computer relative to the housing and relative to the paper make the printer especially suited for use in a vehicle, such as a delivery truck, because the printer can be laid on a seat and a computer carried within the printer still can be operated easily by the driver of the vehicle. When the receiving well cover 14 is closed, the panel 42 on the opposite side of the printer's top surface can be raised to expose a storage area (not illustrated), in which items such as the printer's electrical cord can be stored. The receiving well and storage area can be removed and reversed in location. This is especially useful to accommodate left-hand drive and right-hand drive vehicles, so that the receiving well 16 can be placed on the right half of the printer. A carrying handle 44 allows the printer to be easily lifted and moved about.

When the portable computer 18 is to be connected with the printer 10, the computer's orientation in the receiving well is restricted by the elongated retaining members 22 and by a lip 48 that extends partly over the forward end of the computer. As shown more particularly in FIGS. 2-5, the elongated retaining members include upwardly projecting forward ends 50 and bent rear ends 52. The forward ends project out of openings 54 in the floor 56 of the receiving well 16, while the rear ends project out of rear openings 58 in the floor and fit into recesses 60 in the wall 62 of the receiving well. The forward ends prevent the computer 18 from moving forward in the well 16 until the rear ends have been fit over the computer, which means that the computer first must be laid flat in the receiving well. After the computer has been laid flat, the lever 20 can be used to move the retaining members forward, so that the forward ends 50 no longer block the computer from moving and the rear ends 52 push the computer so that the computer slides along the well's floor and the receiving bores 30 are pushed into engagement with the pins 32.

The receiving well lip 48 also restricts movement of the portable computer 18 until the computer is properly oriented in the receiving well 16. The lip extends partly over a portion of the computer and helps prevent the computer from adopting an off-axis orientation relative to the connector pins 32. The computer cannot be pushed beneath the lip, so as to engage the connector socket 24 with the connector plug 26, unless the computer adopts the proper orientation, laid flat in the receiving well and axially parallel to the receiving bores 30.

Figure 3:
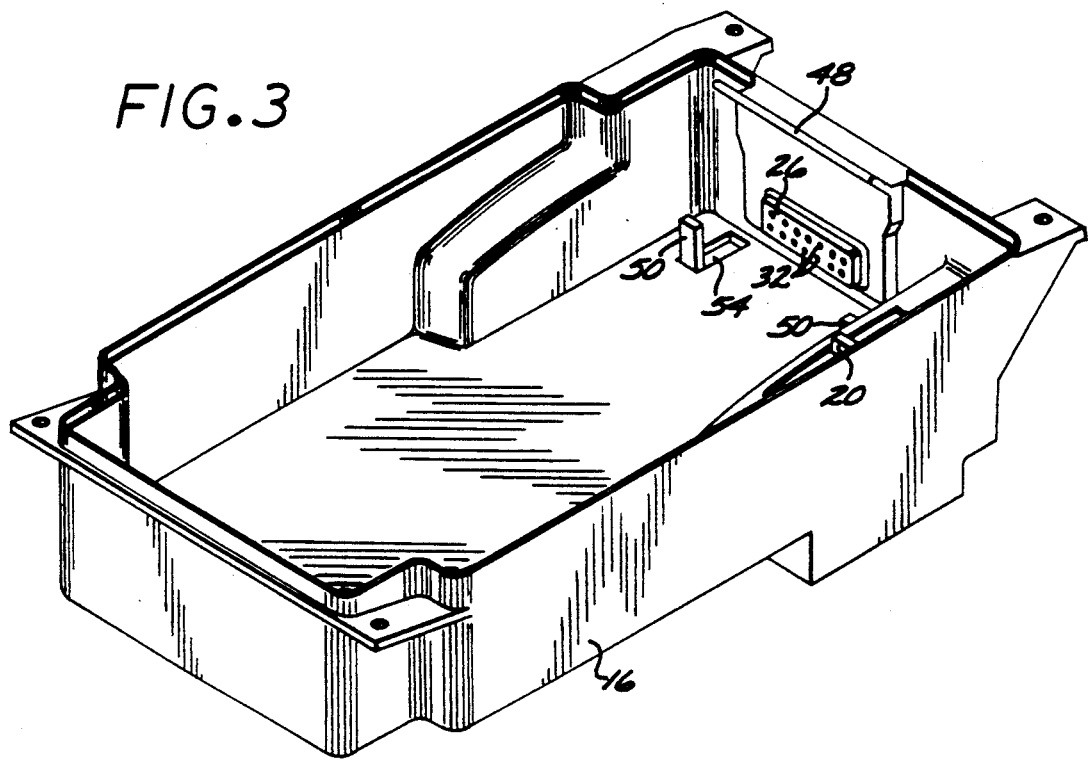
FIG. 3 is a perspective view of the receiving well removed from the printer illustrated in FIG. 1 and showing the retaining arms and lever.
Figure 4:
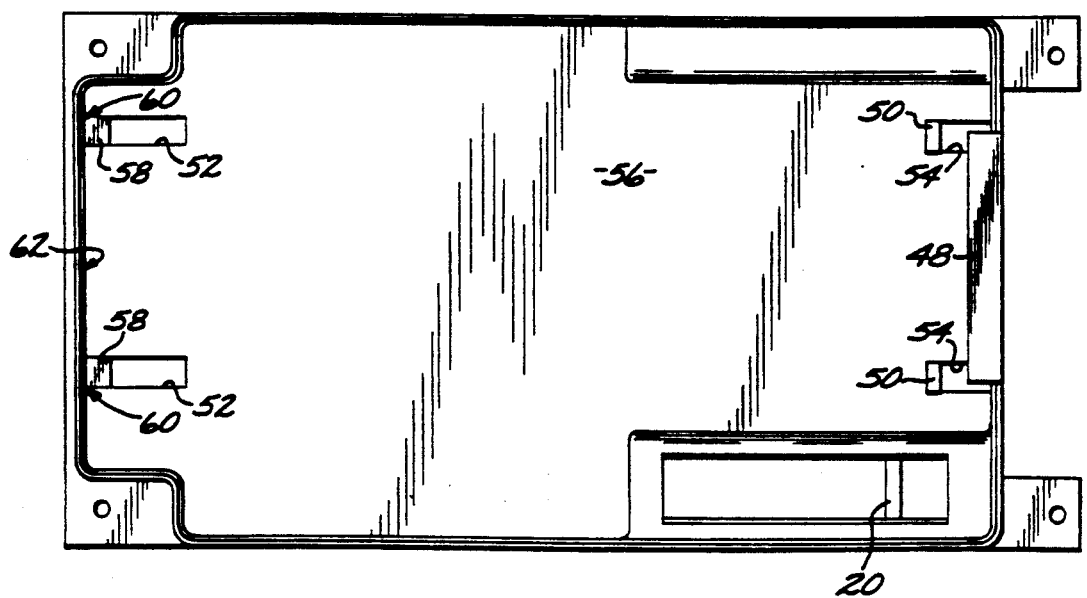
FIG. 4 is a plan view of the receiving well illustrated in FIG. 3.

More particularly, FIG. 3 shows the receiving well 16 removed from the printer housing illustrated in FIG. 1. The forward ends 50 of the retaining members 22 are visible, protruding up from the openings 54 in the floor of the receiving well. The rear ends 52 of the retaining members are visible in the plan view of FIG. 4. FIGS. 3 and 4 also show that the lip 48 projects from the wall of the receiving well over a portion of the computer. The lip extends over the computer 18 sufficiently to prevent the computer from being pushed forward into engagement with the printer connector 26 unless the orientation of the computer is such that the bores 30 are axially parallel with the pins 32. This prevents the pins of one connector from being inserted into the bores of the other connector at an angle, and reduces the possibility of the pins hitting the socket and becoming bent. Thus, the service life of the connector pins thereby is increased.

Figure 5:
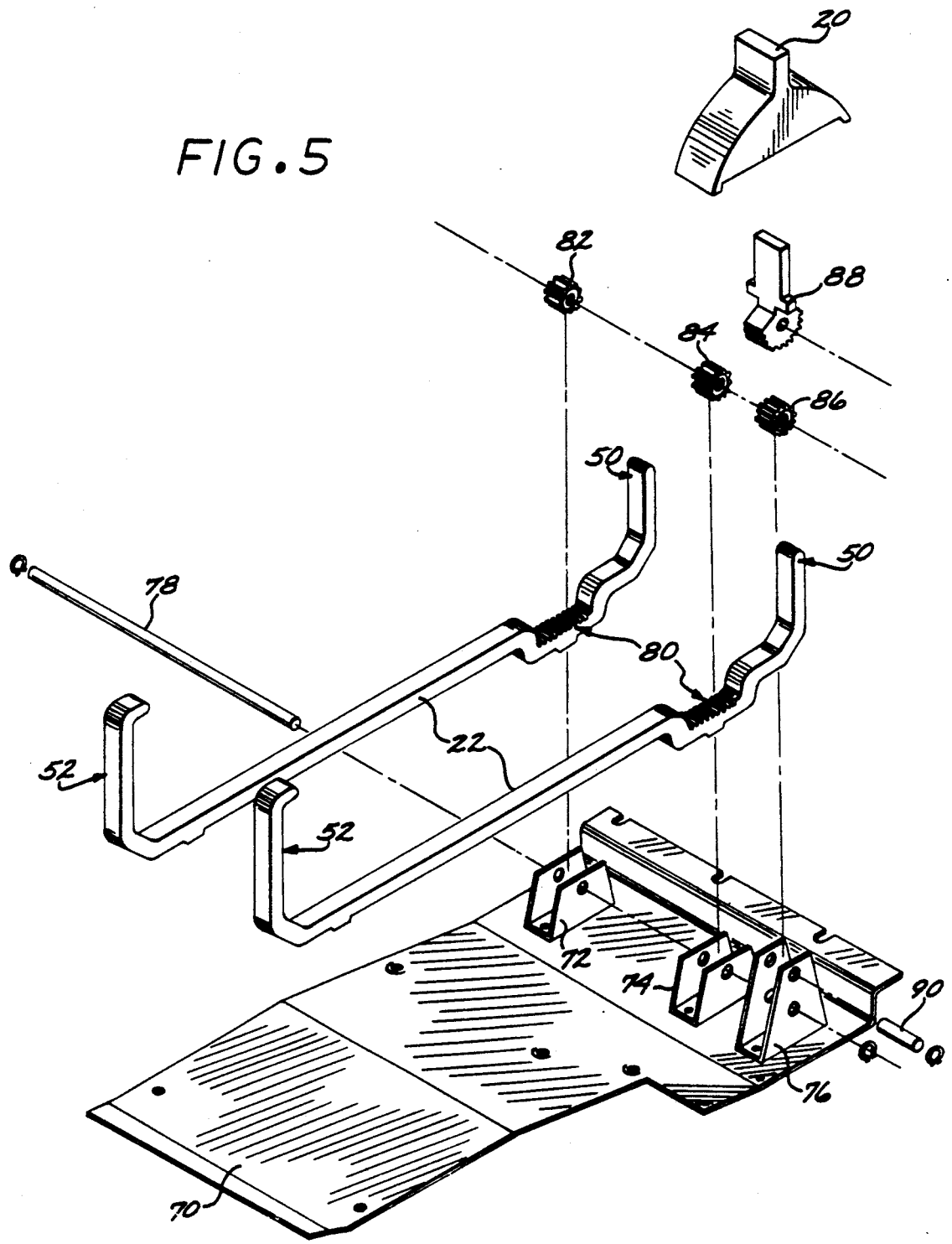
FIG. 5 is an exploded perspective view of the retaining arm assembly shown in FIG. 3.

FIG. 5 shows the mechanical linkage for moving the two elongated retaining members 22 in the receiving well 16. A mounting plate 70 is attached to the underside of the receiving well. Three gear wheel support brackets 72, 74, and 76 are mounted on the mounting plate and include openings for the passage of a gear wheel shaft 78. The two retaining members include toothed sections 80 that are engaged with and driven by respective gear wheels 82 and 84. The gear wheels are keyed to the gear wheel shaft to drive the retaining members forward and backward as the shaft turns. Also turning with the shaft is a drive wheel 86 that is in meshing engagement with a toothed drive arm 88. The arm is keyed to a driving shaft 90 and is turned by the actuating lever 20.

When the actuating lever 20 is pivoted, the drive arm 88 turns with it, rotating the drive wheel 86, which rotates the shaft 78 and rotates the gear wheels 82 and 84 to drive the elongated retaining members 22. This system mechanically links the actuating lever to the retaining members and therefore provides a simple drive system that offers good tactile feedback to ensure positive engagement of the connector pins 32 in the connector bores 30.

A printer in accordance with the present invention can be securely engaged with a portable computer, protects the connector plug and socket combination from excessive wear and damage, and is convenient to use. A receiving well in the printer accepts a portable computer and includes retaining members that force the computer to adopt the proper orientation for axial insertion of the bore 30 of the computer's connector 24 with the pins 32 of the printer's connector 26 and that push the computer into engagement with the printer. The retaining members are pushed through a mechanical gear wheel linkage that cannot be operated unless the computer is in the proper orientation. A projecting lip also forces the computer to assume the proper orientation before it can be pushed into engagement with the printer. Thus, the printer securely engages the connector socket of the computer and ensures that the pins of the printer plug will not become bent during coupling and uncoupling.

The present invention has been described above in terms of a presently preferred embodiment so that an understanding of the present invention can be conveyed. There are, however, many configurations for printers not specifically described herein, but with which the present invention is applicable. For example, the portable computer might have a connector plug rather than a socket, and the printer might have a connector socket rather than a plug. Further, an optical data link might be substituted for the plug/socket arrangement described.

The present invention should therefore not be seen as limited to the particular embodiments described herein, but rather, it should be understood that the present invention has applicability with respect to printers in a variety of applications. All modifications, variations, or equivalent arrangements that are within the scope of the attached claims should therefore be considered to be within the scope of the invention.

I claim:

1. A printer system, for use with a portable computer having a connector, comprising:
   a housing;
   a printer, contained within the housing, for receiving data and for printing characters representing the data onto a readable medium;
   a printer connector, coupled to the printer, that can be engaged with the computer connector to send and receive data from the portable computer to the printer; and
   sliding means, adapted to slide relative to the housing, for moving the portable computer relative to the printer connector such that the orientation of the computer relative to the printer connector cannot be changed unless the computer connector is completely disengaged from the printer connector.

2. A printer system as defined in claim 1, wherein the housing includes a receiving well that is adapted to receive the portable computer and the sliding means includes at least one retaining arm that slides relative to the well to retain the computer in the well and prevent any change in orientation of the computer relative to the well, and also includes a housing lip that extends partly over the cradle such that the orientation of the computer relative to the cradle cannot be changed unless the computer connector is completely disengaged from the printer connector.

3. A printer system as defined in claim 2, further comprising an operating lever that is coupled to the retaining arm and that is adapted to be moved from a receiving position, in which the arm is moved relative to the housing lip so that it can receive the portable computer, to an engaged position, in which the arm is moved such that the computer connector is fully engaged with the printer connector and the orientation of the computer relative to the receiving well cannot be changed.

4. A printer system as defined in claim 3, wherein the retaining arm includes a toothed portion and the printer system further includes a toothed drive wheel that is in meshing engagement with the toothed portion of the retaining arm and that is driven by the operating lever.

5. A printer system as defined in claim 3, wherein the retaining arm includes an upwardly bent portion that is adjacent to the front edge of the computer when the operating lever is in the receiving position, and which includes a hooked portion that fits around the opposite end of the computer when the operating lever is moved to an engaged position.

6. A printer system as defined in claim 5, wherein the retaining arm includes a toothed portion and the system further includes a drive wheel that is rotated by movement of the operating lever and that is in meshing engagement with the toothed portion of the retaining arm.

7. A printer system as defined in claim 2, further comprising drive means for moving the retaining arm so that it slides relative to the well.

8. A printer system as defined in claim 7, wherein the drive means includes:
   a toothed portion on the retaining arm;
   a toothed gear wheel that is in meshing engagement with the toothed portion of the retaining arm; and
   an operating lever that is coupled to the gear wheel such that movement of the operating lever between an engaged position and an disengaged position rotates the gear wheel and moves the retaining arm so that it slides relative to the well.

9. A printer system as defined in claim 8, wherein the retaining arm includes a bent portion that projects across a portion of the top surface of the portable computer when the operating lever is moved to the engaged position.

10. A printer system as defined in claim 1, wherein:
    the printer connector includes a plurality of parallel pins; and
    the portable computer connector includes a plurality of parallel bores sized to receive the plurality of pins of the printer connector.

11. A printer system for use with a portable computer having a housing with a connector having a plurality of parallel, pin-receiving bores, the printer system comprising:
    a housing;
    a printer, contained within the housing, for receiving data and for printing characters representing the data onto a readable medium;
    control means for coupling to the communications connector of the portable computer and for providing data from the computer to the printer means;
    a printer connector, coupled to the control means, that can be engaged with the computer connector to send and receive data between the computer and the control means, the printer connector having a plurality of parallel pins, each of which is engageable with one of the bores of the computer connector;
    wherein the housing further includes sliding means for receiving the portable computer and restricting the movement of the computer to be in a direction parallel with the pins of the printer connector such that the pins can be inserted into the bores of the computer connector, and for releasing the computer and allowing it to be removed only when the bores are completely free of the pins.

12. A printer system as defined in claim 11, wherein the sliding means comprises:
    a receiving well that receives the portable computer and includes a well surface that conforms to the housing of the computer; and
    latching means for moving the computer relative to the receiving well and preventing any change in orientation of the computer relative to the well after the well has received the computer.

13. A printer system as defined in claim 12, wherein the latching means includes a sliding arm that extends over a portion of the portable computer housing.

14. A printer system as defined in claim 12, wherein the sliding means includes a slide lever that mechanically moves the portable computer relative to the printer system housing.

* * * * *